Aug. 21, 1951 A. ZUCKERMANN 2,564,945
ELECTROMAGNETIC RAIL BRAKE
Filed Oct. 16, 1948 2 Sheets-Sheet 1
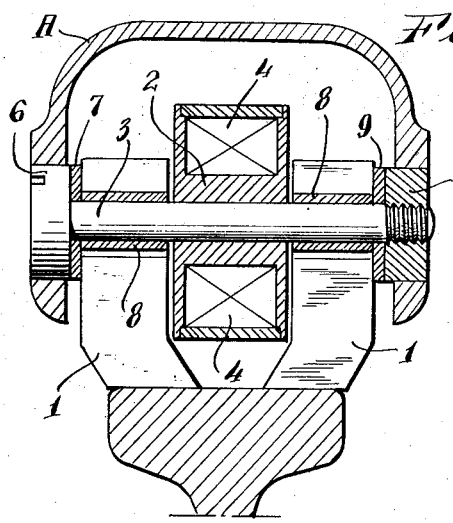
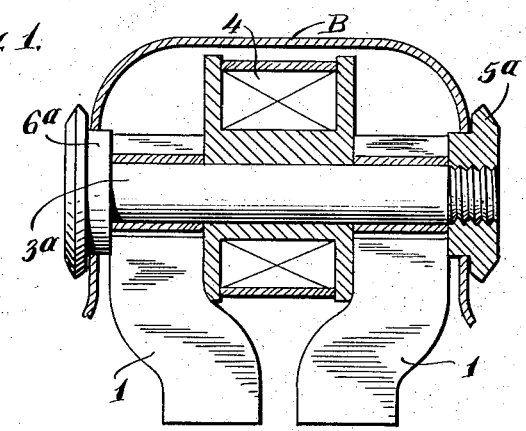
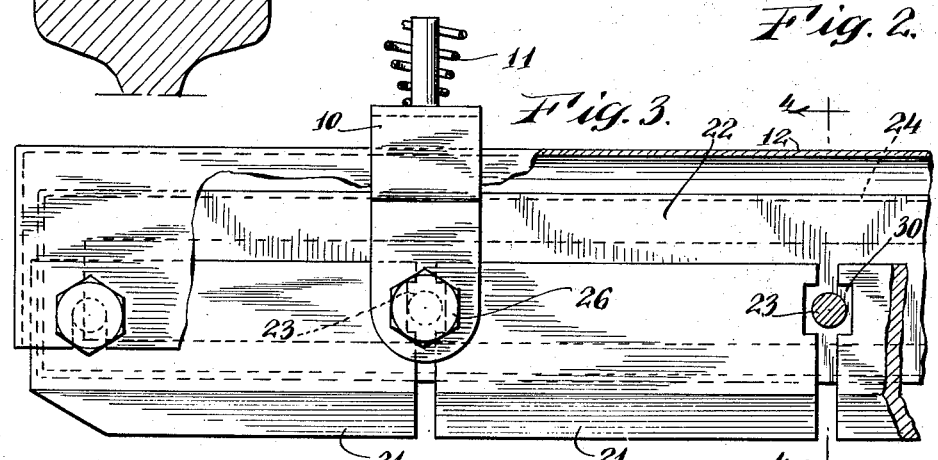
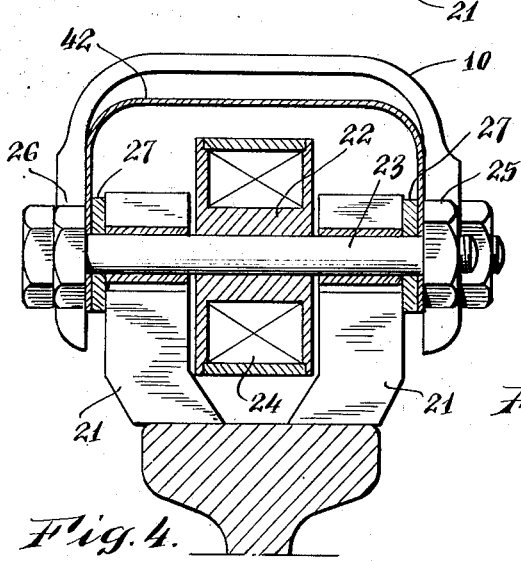
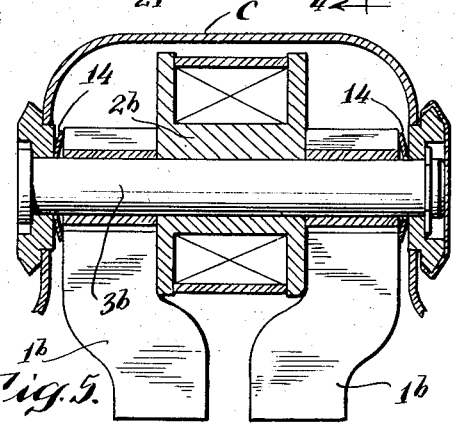
INVENTOR.
Armand Zuckermann
BY
Haseltine, Lake & Co.
AGENTS.

Aug. 21, 1951  A. ZUCKERMANN  2,564,945
ELECTROMAGNETIC RAIL BRAKE
Filed Oct. 16, 1948  2 Sheets-Sheet 2
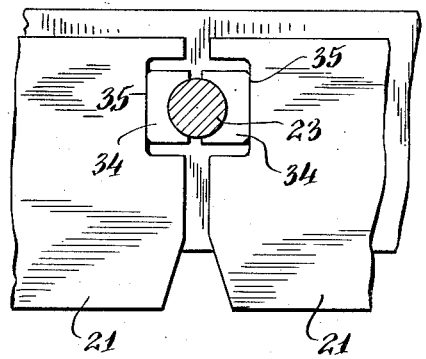
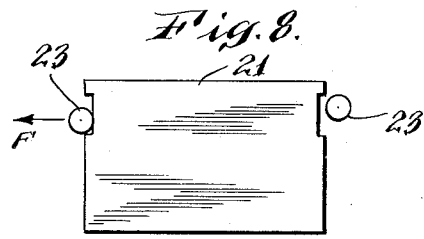
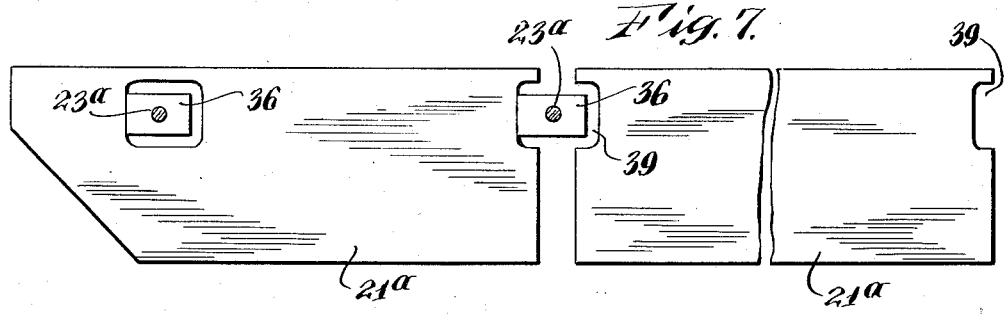
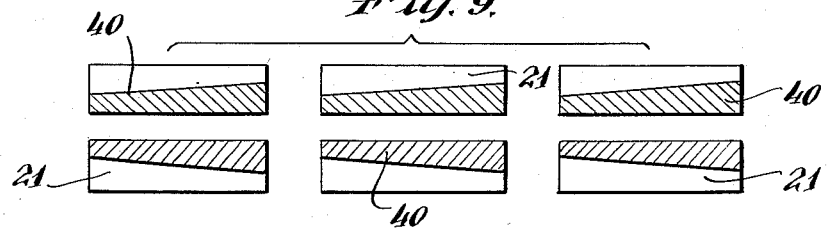
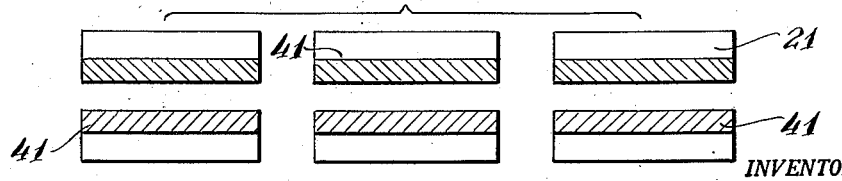
INVENTOR.
Armand Zuckermann
BY
Houltine, Lake & Co.
AGENTS.

Patented Aug. 21, 1951

2,564,945

UNITED STATES PATENT OFFICE 2,564,945

ELECTROMAGNETIC RAIL BRAKE

Armand Zuckermann, Paris, France, assignor to Societe Anonyme Freins Jourdain-Monneret, Paris, France Application October 16, 1948, Serial No. 54,918
In France December 12, 1946

8 Claims. (Cl. 188—165)

1

The present invention relates to electro-magnetic brakes for rail vehicles whose magnetic parts are made of a material having a high magnetic permeability, of the order of that of pure iron, and whose conductors for the electro-magnetic windings are capable of a high current density and insulated by materials having a high thermal resistance, of the order of that of the plastic materials known under the designation of "silicones." Such brakes are already known, in accordance with my patent application, filed on May 29, 1947, Serial Number 751,289 for Electromagnetic Brake for Rail Vehicles, patented February 20, 1951, No. 2,542,788, wherein the moving parts playing the parts of shoes slide directly on the core of the electromagnet. With a view to insuring their inner guiding, and particularly for electro-magnetic brakes consisting of a series of elementary blocks of unitary shoe and flange members succeeding one another in the direction of the rail, the latter are suspended freely on a common longitudinal support whereon they are guided externally, this support being itself suspended elastically on the vehicle. The shoe flanges, in this embodiment are endowed with two degrees of freedom (pivoting and translation), and the common longitudinal support of light non-magnetic alloy is associated with the organs for the suspension and the transmision of the braking stresses.

The external guiding of the shoe flanges insured by the common longitudinal support may be prevented when this support is subjected to deformations caused by abnormal braking stresses.

Further, to allow the shoe flanges the motions of pivoting and translation, they are suspended from the articulation spindles with a vertical and horizontal clearance. Such a mounting, however, by a point contact or a linear contact only of these axles with the surface of the corresponding notch of the shoe flange may lead to seizing of the latter, thus suppressing the free possibility of motion at one of its ends while the other end remains perfectly free to move.

With a view to obviate the above drawbacks, the main object of the invention is to provide an electromagnetic brake comprised of a series of elementary blocks of shoe flanges succeeding one another in the direction of the rail and suspended freely from a common longitudinal support, wherein this common longitudinal support has an inner width greater than the thickness of the shoe flanges after mounting, the ex-

2 ternal guiding of the latter being effected directly or indirectly through the spindles used for their suspension from this support and wherein the pressures and wears opposite the points of articulation of each one of the elementary shoe flanges are decreased while allowing the two above mentioned degrees of freedom.

Another object of the invention is to provide an electromagnetic brake of the type described wherein the support made of light alloy is partially or completely eliminated, the articulation axes of the shoe flanges associated with the central core being used for guiding directly or indirectly these flanges, as indicated above, said core being provided with suspension means from the braking shoe. There results an important saving in cost and weight.

Another object of the invention is to provide in an electromagnetic brake of the type described a single inner guiding of the shoe flanges on the core of the electromagnet, elastic means being interposed transversely between these shoe flanges and their suspension members.

Another object of the invention is to provide, in an electromagnetic brake of the type described, a journal between the articulation spindle of the shoe flange and the corresponding notch of the latter with the necessary clearance to allow the pivoting and the vertical translation of these shoes.

The description which follows, in connection with the appended drawings given by way of nonlimitative examples only will clearly show how the invention may be put into effect.

Figure 1 is a sectional view of an electromagnetic brake in accordance with the invention.

Figure 2 is a modified application of Figure 1.

Figure 3 is an elevational view of an electromagnetic brake comprising a series of elementary blocks of shoe flanges without any common support, in accordance with the present invention.

Figure 4 shows a transverse section of Figure 3 along line III—III.

Figure 5 is a modification of Figure 2.

Figure 6 shows in longitudinal section an electromagnetic brake with articulated shoes and a two-piece journal.

Figure 7 shows a modification of the embodiment shown in Figure 6 with a one-piece journal.

Figure 8 shows an element of a shoe flange, seized.

Figures 9 and 10 are diagrams showing, in plan view, the incorrect and correct wears, respectively, of a shoe with articulated shoe flanges without and with a journal.

As shown in Figure 1, the support A made of non-magnetic material has an inner width greater than the thickness of the two shoe and flange members 1 mounted on central core 2 of the excitation winding 4. The axis of articulation of the shoe and flange members is constituted by a bolt 3 mounted snugly in the core, provided with a cylindrical head 6 housed inside the bore of the support and bearing journals 8 for the shoe flanges. A washer 7 of a metal with a low friction coefficient, such as bronze, for example, is interposed between the cylindrical head 6 and the shoe flange 1. Bolt 3 is fixed by a cylindrical nut 5 and a washer 9, similar to washer 7, is interposed between the cylindrical nut 5 and the other shoe flange 1 of the block of shoe flanges. The nut is screwed on the bolt so as to provide the clearance of a few tenths of a millimeter necessary for the guiding action between the washers and the corresponding shoe flanges. In the embodiment shown in Figure 1, the common support A does not fulfill any guiding function and acts merely for the suspension of the shoe and the transmission of the braking stresses to this shoe without being involved in the magnetic circuit, said support being maintained by the angular form of the head of the bolt 6 and of the nut 5.

Instead of using a washer, guiding of the shoe flanges could be effected directly by the head 6a of bolt 3a, as shown in Figure 2 and by a nut 5a both offering then a substantial overlap with respect to the inner lateral surfaces of the common support B.

These embodiments lead to a saving in space and in width, an appreciable saving for an easy insertion of the shoe in the railroad clearances.

As shown in Figures 3 and 4, the unitary shoe and flange members 21 are assembled on both sides of the central core 22 and of its excitation winding 24 by bolts 23 going through the core without any clearance. On these bolts notches 30 of the shoe flanges bear with a certain amount of vertical and horizontal play with a view to allowing them to be displaced in a vertical plane by pivoting and translation with respect to bolts 23. Bolts 23 and nuts 25 are so mounted as to allow a clearance of a few tenths of a millimeter necessary to the motion of shoe flanges 21. The bolt head 26 is of a larger dimension than the normal bolt head, and guiding washers, preferably non-magnetic and of hard alloy, may be interposed between the head and the two adjacent shoe flanges 21 cooperating with this head with a view to insuring their guiding. The stop nut 25 is stopped by any suitable means, a pin for instance, to provide this clearance respectively between the shoe flanges 21 and the bolt head 26 and either itself or a guiding washer as shown in Figure 1.

The suspension of the electromagnetic brakes may be effected either by using the bolts used for guiding, as shown in Figure 3 or by using additional bolts going through the core, without any clearance, and through the shoe flanges with a clearance sufficient to allow their vertical motion, or finally by means of a bolt going through an extension of the core.

As shown in Figure 3, bolt 23 serves as an articulation axis for a support fork 10 connected to a spring 11 or any other normal suspension device In this embodiment a plurality of U-shaped forks 10 take the place of support A, there being at most one fork to each bolt.

Further, the moving parts of the electromagnetic brake may be protected in such a case, by a simple protection sheet 12 as shown in Figures 3 and 4.

In the embodiment shown in Figure 5, the shoe flanges 1b are guided only by their inner faces on core 2b, a clearance existing between support c and their articulation pieces 3b on one hand and their outer surfaces on the other hand. In this clearance, springs 14 are housed to press the shoe flanges 1b against the core 2b with a view to avoiding the penetration of dust between their surfaces of contact.

Finally, to insure a decrease of the pressures and wears facing the articulation points of each of the elementary shoe flanges, as shown in Figure 6, a two-piece journal 34 is interposed between the bolt 23 acting as a suspension spindle for the shoe flange elements and elements 21. These two parts offer outer plane faces 35 insuring the bearing of shoe flanges 21 without preventing their vertical translation motion. These two parts, when assembled, offer a cylindrical inner surface allowing the pivoting of the shoe flange 21 about bolt 23.

Each one of the suspension spindles 23a in the embodiment shown in Figure 7, is forced into the central bore of a journal 36 of a rectangular outline which is engaged with a vertical and horizontal clearance in corresponding recesses 39 of the shoe flange elements 21a.

The half jounals or journals, by offering a wide contact surface with the recesses of the shoe flanges prevent the seizing which could occur from merely a point or linear contact between one of the suspension spindles of a shoe flange element and the surface of the corresponding recess of the shoe flange, thus suppressing the possibility of free motion of the element at one of its ends, while its other end would remain perfectly free to move. Figure 8 illustrates this operation fault which causes an irregular wear of the articulated shoe flanges as shown at 40 on Figure 9 where the traces of wear of the shoe flange elements have been shaded. On the contrary, Figure 10 shows at 41 the uniform wear desirable and obtained by the use of journals.

What I claim is:

1. In an electromagnetic brake for rail vehicles, a brake element comprising a core parallel with the rail, a single excitation winding wound on the core, axles fixed on the core, a pair of unitary shoe and flange members located on either side of said core and divided longitudinally into elements articulated with respect to one another on the axles and sliding on the core, a sliding and hinge connection between the shoe flange elements and the axles, a U-shaped common support of a non-magnetic metal having an inner width greater than the thickness of the shoe flange elements and fitting over the core, the ends of the axles being fixed to the support, and means for insuring the external guiding of the shoe flange elements independently of said support.

2. An electromagnetic brake for rail vehicles, in accordance with claim 1, wherein each intermediate shoe flange element comprises on its vertical edges a housing provided with a vertical wall to engage the axles with a large vertical and horizontal play, wherein the terminal shoe flange elements comprise a rectangular aperture engaging respectively the first and the last of the said axles and on their inner vertical edges housings formed with a vertical plane wall engaging respectively the second and the next to last of the said axles, the engagement of the apertures and the last mentioned housings with the corresponding axles taking place with a vertical and horizontal play equal to that existing between the housing and axles and wherein the sliding and hinge connection between the shoe flange elements and the axles comprises two half journals surrounding the axles and formed with vertical lateral faces bearing against the vertical faces of the housing and apertures, the height of the half journals being lower than the heights of the housings and apertures.

3. An electromagnetic brake for rail vehicles, in accordance with claim 1, wherein each intermediate shoe flange element comprises on its vertical edges a housing formed with a vertical plane wall for engaging the axles with a large vertical and horizontal play, wherein the terminal shoe flange elements comprise a rectangular aperture engaging respectively the first and the last of the axles and on their inner vertical walls housings formed with a vertical plane wall engaging respectively the second and the next to last of the said axles, the engagement of the apertures and the last mentioned axles with the corresponding axles taking place with a vertical and horizontal play equal to that existing between the housing and axles and wherein the sliding and hinge connection between the shoe elements and the axles comprises a journal mounted on each axle and having vertical lateral faces bearing against the vertical faces of the housings and of the apertures, the height and width of the journal being lower than the height and width of the apertures and conjugate housings.

4. An electromagnetic brake for rail vehicles, in accordance with claim 1, wherein each axle is constituted by a bolt formed with a head housed in one of the legs of the common support and wherein the external guiding means of the shoe flange elements comprises a washer inserted between the bolt head and the corresponding shoe flange element, a nut mounted on the bolt and housed in the other leg of the support and a second washer inserted between the nut and the other shoe flange element of the same pair of shoe flange elements.

5. An electromagnetic brake for rail vehicles, in accordance with claim 1, wherein each axle is constituted by a bolt formed with a head housed in one of the legs of the common support and wherein the means for the external guiding of the shoe flange element comprises the inner face of the bolt head bearing against the corresponding shoe flange element and a washer mounted on the end of the bolt in the other leg of the support and whose inner face bears against the other shoe flange element of the same pair of shoe flange elements.

6. In an electromagnetic brake for rail vehicles, a brake element comprising a core parallel with the rail, a single excitation winding wound on the core, bolts attached on the core, a pair of unitary shoe and flange members located on either side of this core and divided longitudinally into elements articulated with respect to one another on the bolts and sliding on the core, a sliding and hinge connection between the shoe flange elements and the bolts, nuts mounted on the bolts, a common U-shaped support of non-magnetic metal with an inner width greater than the thickness of the shoe flange elements and sliding on the core to connect the axles with the vehicle and whose legs are shaped to house the heads of the bolts and the nuts, and elastic means interposed between the bolt heads and the corresponding shoe flange elements and between the nuts and the corresponding shoe flange elements.

7. In an electromagnetic brake for rail vehicles, a brake element comprising a core parallel with the rail, a single excitation winding wound on the core, bolts attached on the core, a pair of unitary shoe and flange members located on either side of this core and divided longitudinally into elements articulated with respect to one another on the bolts and sliding on the core, a sliding and hinge connection between the shoe flange elements and the bolts, U-shaped support elements of a non-magnetic metal, in number at most equal to the bolts, with an inner width greater than the thickness of the shoe flange elements and sliding on the core, one leg of each support element receiving the head of a bolt, nuts inserted in the other legs of the supports, and means for insuring the external guiding of the shoe flange elements independently of the supports.

8. An electromagnetic brake for rail vehicles, in accordance with claim 7, comprising additionally a U-shaped common protector enveloping the core and the shoe flange elements and fixed on the bolts inside the support elements.

ARMAND ZUCKERMANN.

REFERENCES CITED

The following references are of record in the file of this patent:

FOREIGN PATENTS

| Number | Country | Date |
|--------|---------|------|
| 702,166 | Germany | Apr. 10, 1938 |
| 823,411 | France | Jan. 20, 1938 |
| 827,409 | France | Apr. 26, 1938 |